United States Patent
Sakurai et al.

(10) Patent No.: US 8,374,093 B2
(45) Date of Patent: Feb. 12, 2013

(54) REPEATER MONITOR SYSTEM AND REPEATER MONITOR METHOD

(75) Inventors: Kiyoshi Sakurai, Osaka (JP); Kazuyuki Seri, Osaka (JP); Tatsuo Furukawa, Osaka (JP)

(73) Assignee: Icom Incorporated, Osaka (JP)

( * ) Notice: Subject to any disclaimer, the term of this patent is extended or adjusted under 35 U.S.C. 154(b) by 368 days.

(21) Appl. No.: 12/620,121

(22) Filed: Nov. 17, 2009

(65) Prior Publication Data

US 2010/0124168 A1    May 20, 2010

(30) Foreign Application Priority Data

Nov. 18, 2008  (JP) .................................. 2008-294503

(51) Int. Cl.
*G01R 31/08*  (2006.01)
(52) U.S. Cl. ........ 370/241; 370/315; 370/492; 370/278; 370/279; 370/293; 370/501; 370/246; 370/274
(58) Field of Classification Search .................... None
See application file for complete search history.

(56) References Cited

U.S. PATENT DOCUMENTS

2009/0287815 A1 *  11/2009  Robbins et al. ............... 709/224

FOREIGN PATENT DOCUMENTS

| JP | 2001-136206 | 5/2001 |
| JP | 2002-330108 | 11/2002 |

* cited by examiner

*Primary Examiner* — Kibrom T Hailu
(74) *Attorney, Agent, or Firm* — Baker & McKenzie, LLP

(57) ABSTRACT

A monitor terminal transmits a monitor request command to monitor a repeater station designated by an operator to a monitor server via the Internet. The monitor server detects a monitor station located in the communication range of the designated repeater station from the content of the received monitor request command, and transmits a monitor instruction command to the detected monitor station via the Internet. The monitor station intercepts a radio signal during transmission from the repeater station to a radio communication device or vice versa. Upon reception of the monitor instruction command, the monitor station transmits the intercepted radio signal as monitor data to the monitor server. The monitor server transfers the monitor data to the monitor terminal. Upon reception of the monitor data transferred from the monitor server, the monitor terminal radio-transmits the received monitor data using a radio wave format receivable by the radio communication device.

5 Claims, 8 Drawing Sheets

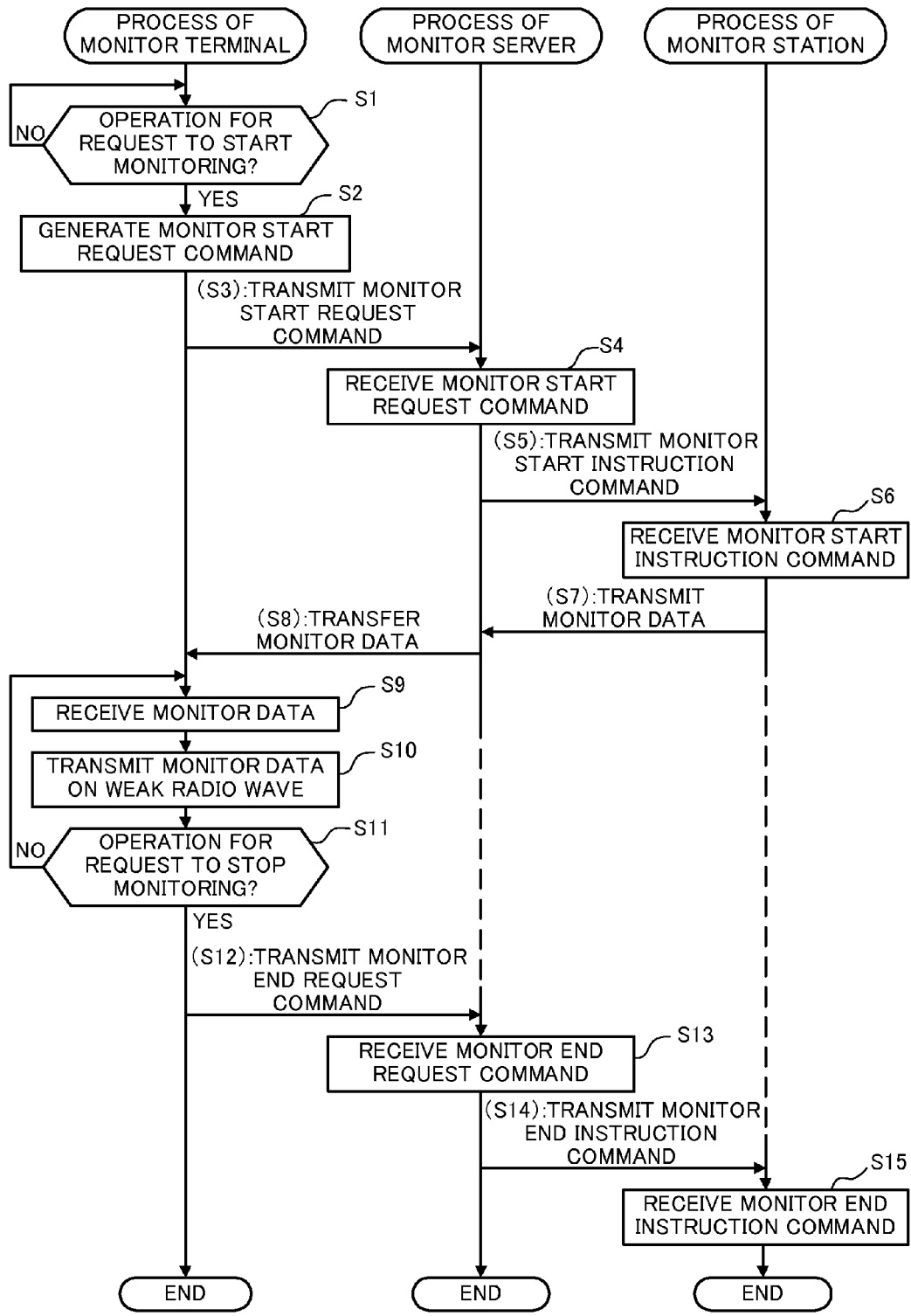

FIG.6 COMMAND PACKET ON INTERNET

| MAC HEADER | IP HEADER | | UDP HEADER | ... | REPEATER STATION AREA ID | MONITOR START REQUEST | ... |
|---|---|---|---|---|---|---|---|
| | SENDER ADDRESS | DESTINATION ADDRESS | | | | | |

FIG.7 RADIO PACKET OF D-STAR FORMAT

| RADIO PART HEADER | | | | DATA PART | | | | |
|---|---|---|---|---|---|---|---|---|
| SYNC PATTERN | FLAG | ID | FCS | AUDIO FRAME | DATA FRAME | ... | AUDIO FRAME | LAST FRAME |

| RECEIVER RELAY STATION CALL SIGN | SENDER RELAY STATION CALL SIGN | DESTINATION STATION CALL SIGN | LOCAL STATION CALL SIGN 1 | LOCAL STATION CALL SIGN 2 |
|---|---|---|---|---|

FIG.8 DATA PACKET ON INTERNET

| MAC HEADER | IP HEADER | | UDP HEADER | ... | DATA PART | |
|---|---|---|---|---|---|---|
| | SENDER ADDRESS | DESTINATION ADDRESS | | | AUDIO FRAME | DATA FRAME |

REPEATER MONITOR SYSTEM AND REPEATER MONITOR METHOD

RELATED APPLICATION

This application claims the priority of Japanese Patent Application No. 2008-294503 filed on Nov. 18, 2008, which is incorporated herein by reference in its entirety.

BACKGROUND OF THE INVENTION

1. Field of the Invention

The present invention relates to a communication technology using both radio communication and the Internet, and, particularly, to a technique for monitoring the use conditions of a remote repeater.

2. Description of the Related Art

FIG. 11 is a structural diagram showing the outline of a D-STAR (Digital Smart Technologies for Amateur Radio) system which is one example of a communication system using both radio communication and the Internet.

This D-STAR system uses an IP (Internet Protocol) network (hereinafter referred to as Internet). The D-STAR system has a plurality of repeater stations 2 for each of a plurality of zones 7 to relay radio waves from a radio device or radio 1, and a gateway 3 which manages the operations of the repeater stations 2 and relays communication between the repeater stations 2 and an Internet 5. In each zone 7, all the repeater stations 2 are connected by a trunk line 4 which is a high-speed dedicated line. The Internet 5 is connected with a management server 6 which manages communication information or the like of the individual radios 1.

Each radio 1 has a user ID (e.g., call sign of the amateur radio) or a unique identification code to specify a user. Each repeater station 2 has an area ID (e.g., call sign of the amateur radio) or an address to specify the radio communication range. Each gateway 3 and the management server 6 are given IP addresses for specifying their positions on the Internet.

In such a D-STAR system, each gateway 3 monitors the state of the radio 1 present in each area via the repeater station 2 in the same zone 7, and informs the management server 6 of the communication information or the like of each radio 1 via the Internet 5. The management server 6 saves the communication information or the like of the radio 1 informed by each gateway 3 in a database, and informs the communication information or the like of each radio 1 in response to an inquiry from each gateway 3.

In a case where, for example, a radio 1a in a zone 7a communicates with a radio 1b in a zone 7b in the D-STAR system, the sender radio 1a transmits, to a repeater station 2a, a message of voice, data or the like, by designating the user ID of the destination radio 1b. The message transmitted from the radio 1a is received by a repeater station 2a present in the area where the radio 1a is located, and is transferred to a gateway 3a directly or via the trunk line 4.

The gateway 3a informs the management server 6 of the user ID of the destination radio 1b, and inquires about the communication information or the like of the radio 1b. Then, the gateway 3a acquires the area ID of a repeater station 2b communicatable with the destination radio 1b and the IP address of a gateway 3b which controls the repeater station 2b from the management server 6. The gateway 3a adds the acquired IP address and area ID to the message transmitted from the radio 1 a, and transmits the resultant message onto the Internet 5.

Upon reception of the message, transmitted from the gateway 3a, via the Internet 5, the destination gateway 3b transfers the received message to the corresponding repeater station 2b according to the area ID added to the message. The repeater station 2b converts the message transferred from the gateway 3b to a radio signal, and transmits the radio signal to the radio 1b. This allows the radio 1b located in the area of the repeater station 2b to receive the message from the sender radio 1a.

As apparent from the above, the D-STAR system uses the Internet 5 as a relay circuit to enable communication between remote radios 1 which cannot be covered by radio communication.

However, D-STAR system cannot know the status of a repeater station 2 provided at a remote site in an attempt to communicate with the repeater station 2. Problematically, this will cause a failure to connect to such a remote repeater station 2 when the repeater station 2 being busy, or will be the cause of interruption to the communication being performed by the repeater station 2.

As an art relating to this problem, Patent Document 1 (Unexamined Japanese Patent Application KOKAI Publication No. 2001-136206) describes a communication system which monitors what is talked over a transceiver and transmits the talking contents to a transceiver or the like located out of the communication range via the Internet. Patent Document 2 (Unexamined Japanese Patent Application KOKAI Publication No. 2002-330108) describes a radio communication monitor system in which radio transmitting/receiving devices that are sited zone by zone and perform transmission/reception communication with a plurality of radios are connected by an intranet, and the contents of communication between a radio transmitting/receiving device and a radio in another zone are monitored.

However, the Patent Documents 1 and 2 merely disclose techniques intended to monitor the contents of communication with another transceiver or the like, and have no description on monitoring the use conditions or the like of each repeater station which relays a message.

SUMMARY OF THE INVENTION

Accordingly, it is an object of the present invention to provide a repeater monitor system and repeater monitor method which can monitor contents of communication of a remote repeater station.

To achieve the object, according to a first aspect of the invention, there is provided a repeater monitor system in a communication system including plural sets each having a single repeater station or a plurality of repeater stations which relay communication between radio communication devices, and a gateway which manages an operation of the single repeater station or the plurality of repeater stations and relays communication between the repeater station to be managed and an Internet, the repeater monitor system monitoring communication contents of the repeater station and comprising:

a monitor terminal; and a plurality of monitor stations, wherein the monitor terminal transmits via the Internet a monitor request command for requesting monitor data on the communication content of the repeater station designated by an operator, to a monitor station that corresponds to the repeater station, receives via the Internet the monitor data transmitted from the monitor station, and radio-transmits the received monitor data, and the monitor station is located in a communication range of the repeater station to intercept a radio signal during transmission from the repeater station to the radio communication device or vice versa, and transmit via the Internet the intercepted radio signal as the monitor data to the monitor terminal in response to the monitor request command received via the Internet.

In the repeater monitor system according to the first aspect of the present invention, the monitor terminal may detect a monitor station that corresponds to a repeater station designated by an operator, transmit via the Internet the monitor request command to the detected monitor station, and receive via the Internet the monitor data transmitted from the monitor station.

According to a second aspect of the invention, there is provided a repeater monitor system in a communication system including plural sets each having a single repeater station or a plurality of repeater stations which relay communication between radio communication devices, and a gateway which manages an operation of the single repeater station or the plurality of repeater stations and relays communication between the repeater station to be managed and an Internet, the repeater monitor system monitoring communication contents of the repeater station and comprising:

a monitor terminal;
a monitor server; and
a plurality of monitor stations, wherein the monitor terminal transmits via the Internet a monitor request command for requesting monitor data on the communication content of a repeater station designated by an operator to the monitor server, receives via the Internet the monitor data transmitted from the monitor server, and radio-transmits the received monitor data, the monitor server detects a monitor station corresponding to the designated repeater station from a content of the monitor request command received from the monitor terminal, transmits via the Internet a monitor instruction command generated based on the monitor request command to the detected monitor station, receives via the Internet the monitor data transmitted from the monitor station, and transmits via the Internet the received monitor data to the monitor terminal, and the monitor station is located in a communication range of the repeater station to intercept a radio signal during transmission from the repeater station to the radio communication device or vice versa, and transmit via the Internet the intercepted radio signal as the monitor data to the monitor server in response to the monitor instruction command received via the Internet.

According to a third aspect of the invention, there is provided a repeater monitor system in a communication system including plural sets each having a single repeater station or a plurality of repeater stations which relay communication between radio communication devices, and a gateway which manages an operation of the single repeater station or the plurality of repeater stations and relays communication between the repeater station to be managed and an Internet, the repeater monitor system monitoring communication contents of the repeater station and comprising:

a monitor terminal that transmits via the Internet a monitor request command for requesting monitor data on the communication content of the repeater station to a gateway that corresponds to the repeater station, receives via the Internet the monitor data transmitted from the gateway, and radio-transmits the received monitor data, wherein upon reception of the monitor request command via the Internet, the gateway transmits, via the Internet, data to be transmitted to the radio communication device, or data received from the radio communication device, by the repeater station, to the monitor terminal as the monitor data.

In the repeater monitor system according to a third aspect of the present invention, the monitor terminal may detect a gateway that corresponds to a repeater station designated by an operator, transmit via the Internet the monitor request command to the detected gateway, and receive via the Internet the monitor data transmitted from the gateway.

According to a fourth aspect of the invention, there is provided a repeater monitor system in a communication system including plural sets each having a single repeater station or a plurality of repeater stations which relay communication between radio communication devices, and a gateway which manages an operation of the single repeater station or the plurality of repeater stations and relays communication between the repeater station to be managed and an Internet, the repeater monitor system monitoring communication contents of the repeater station and comprising:

a monitor terminal; and
a monitor server, wherein the monitor terminal transmits via the Internet a monitor request command for requesting monitor data on the communication content of a repeater station designated by an operator to the monitor server, receives via the Internet the monitor data transmitted from the monitor server, and radio-transmits the received monitor data, the monitor server detects a gateway corresponding to the designated repeater station from a content of the monitor request command received from the monitor terminal, transmits via the Internet a monitor instruction command generated based on the monitor request command to the detected gateway, receives via the Internet the monitor data transmitted from the gateway, and transmits via the Internet the received monitor data to the monitor terminal, and wherein upon reception of the monitor instruction command via the Internet, the gateway transmits, via the Internet, data to be transmitted to the radio communication device, or data received from the radio communication device, by the repeater station, to the monitor server as the monitor data.

In the repeater monitor system according to the first to the fourth aspects of the present invention, the monitor terminal may radio-transmit the monitor data using a radio wave format receivable by the radio communication device.

In the repeater monitor systems according to the second and fourth aspects of the present invention, upon reception of monitor request commands designating a same repeater station from a plurality of monitor terminals, the monitor server may transmit the monitor instruction command to a corresponding monitor station (or gateway) only once, and upon reception of monitor data corresponding to the monitor instruction command transmitted from the monitor station (or gateway), the monitor server may transmit the received monitor data to the plurality of monitor terminals.

According to a fifth aspect of the invention, there is provided a repeater monitor method in a communication system including plural sets each having a single repeater station or a plurality of repeater stations which relay communication between radio communication devices, and a gateway which manages an operation of the single repeater station or the plurality of repeater stations and relays communication between the repeater station to be managed and an Internet, the repeater monitor method monitoring communication contents of the repeater station and comprising:

causing a monitor terminal to transmit via the Internet a monitor request command for requesting monitor data on the communication content of the repeater station designated by an operator, to a monitor station that corresponds to the repeater station;

causing the monitor station to intercept a radio signal during transmission from the repeater station to the radio communication device or vice versa and transmit via the Internet the intercepted radio signal as the monitor data to the monitor terminal after receiving the monitor request command; and causing the monitor terminal to receive the monitor data transmitted from the monitor station via the Internet and radio-transmit the received monitor data using a radio wave format receivable by the radio communication device.

In the repeater monitor systems according to the fifth aspect of the present invention, the monitor terminal may detect a monitor station located in a communication range of the repeater station designated by an operator, transmit via the Internet the monitor request command to the detected monitor station, and receive via the Internet the monitor data transmitted from the monitor station.

According to a sixth aspect of the invention, there is provided a repeater monitor method in a communication system including plural sets each having a single repeater station or a plurality of repeater stations which relay communication between radio communication devices, and a gateway which manages an operation of the single repeater station or the plurality of repeater stations and relays communication between the repeater station to be managed and an Internet, the repeater monitor method monitoring communication contents of the repeater station and comprising:

causing a monitor terminal to transmit via the Internet a monitor request command for requesting monitor data on the communication content of a repeater station designated by an operator to the monitor server;

causing the monitor server to detect a monitor station located in a communication range of the designated repeater station from a content of the monitor request command received from the monitor terminal, and transmit via the Internet a monitor instruction command generated based on the monitor request command to the detected monitor station, receives via the Internet the monitor data transmitted from the monitor station;

causing the monitor station to intercept a radio signal during transmission from the repeater station to the radio communication device or vice versa and transmit via the Internet the intercepted radio signal as the monitor data to the monitor server after receiving the monitor instruction command;

causing the monitor server to receive via the Internet the monitor data transmitted from the monitor station and transmit via the Internet the received monitor data to the monitor terminal; and causing the monitor terminal to receive via the Internet the monitor data transmitted from the monitor server and radio-transmit the received monitor data using a radio wave format receivable by the radio communication device.

BRIEF DESCRIPTION OF THE DRAWINGS

A more complete understanding of this application can be obtained when the following detailed description is considered in conjunction with the following drawings, in which:

FIG. 5 is a flowchart illustrating operation procedures of a monitor process according to the first embodiment;

FIG. 6 is a diagram showing the frame structure of a command packet to be transmitted on the Internet;

FIG. 7 is a diagram showing the frame structure of a radio packet to be used in a D-STAR system;

FIG. 8 is a diagram showing the frame structure of a data packet to be transmitted on the Internet;

DETAILED DESCRIPTION OF THE PREFERRED EMBODIMENTS

[First Embodiment]

Figure 1:
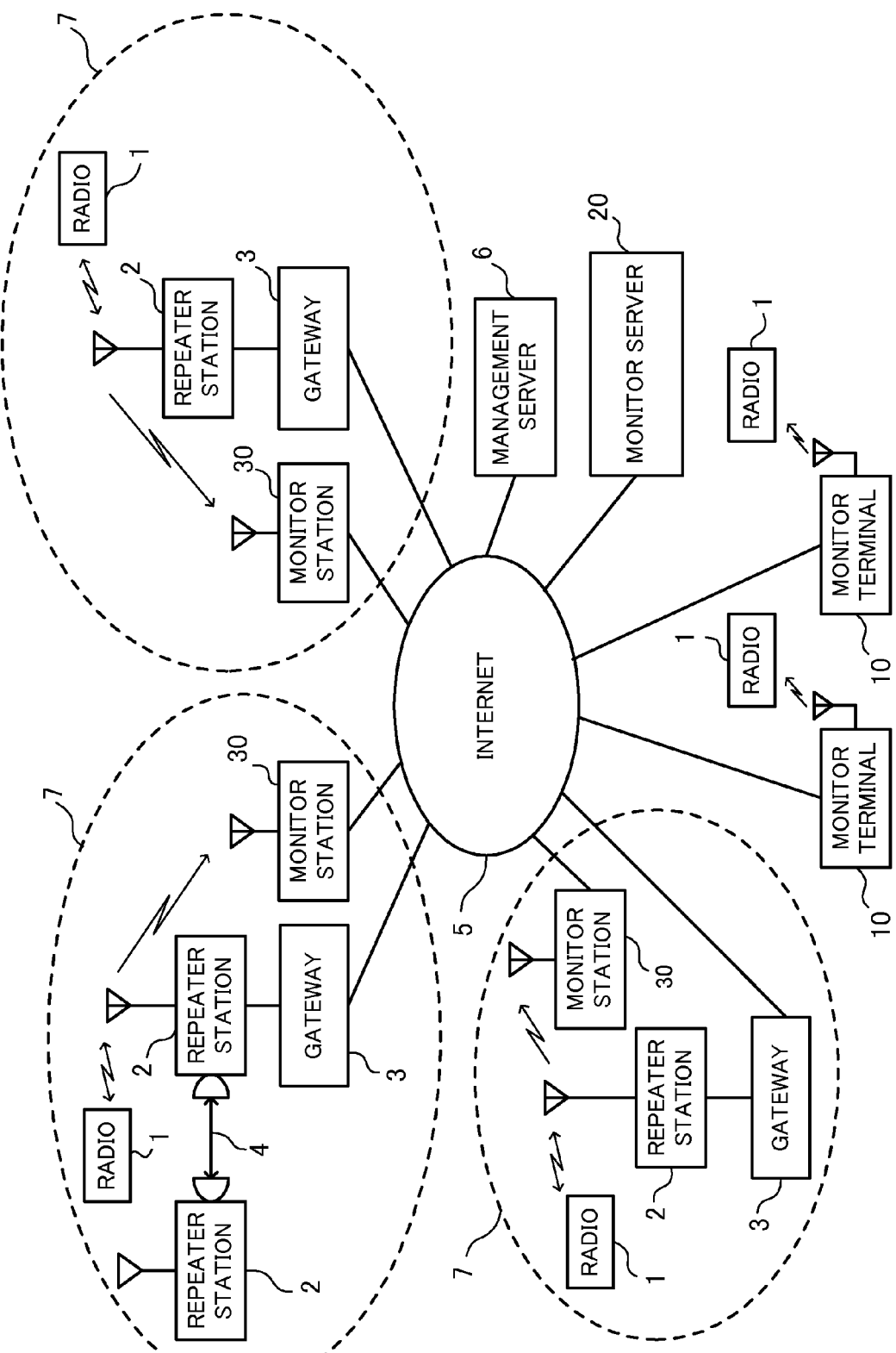
FIG. 1 is a diagram showing the general configuration of a data communication system according to a first embodiment of the invention.
Figure 11:
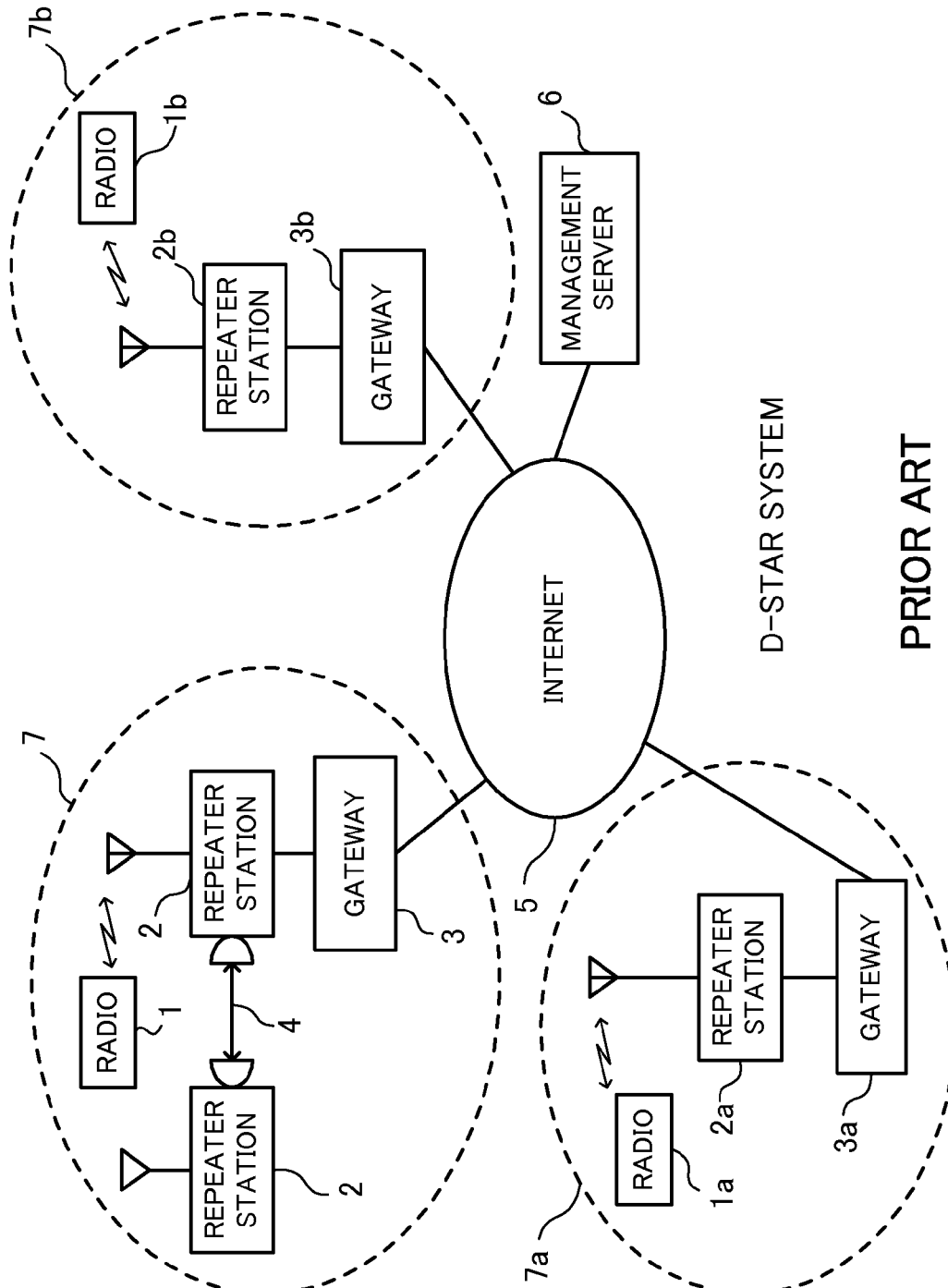
FIG. 11 is a diagram showing the schematic configuration of a conventional D-STAR system.

FIG. 1 is a diagram showing the general configuration of a data communication system according to the first embodiment of the invention. The data communication system according to the embodiment has the configuration of a D-STAR system as its basic configuration, so that same reference numerals are given to those components in FIG. 1 which are common to the components of the D-STAR system (see FIG. 11).

The data communication system according to the embodiment is the D-STAR system added with a function of monitoring the communication conditions of a designated repeater station 2.

The data communication system according to the embodiment has a plurality of repeater stations 2 for each of a plurality of zones 7 to relay radio waves from a radio device or radio 1, and a gateway 3 which manages the operations of the repeater stations 2 and relays communication between the repeater stations 2 and an Internet 5. In each zone 7, all the repeater stations 2 are connected by a trunk line 4 which is a high-speed dedicated line. To the Internet 5 is connected a management server 6 which manages communication information or the like of the individual radios 1.

To monitor the communication conditions of the repeater stations 2, the data communication system further includes monitor terminals 10, a monitor server 20 and monitor stations 30. The monitor terminals 10, the monitor server 20 and the monitor stations 30 are all connected to the Internet 5, and are given unique IP addresses to specify their positions on the Internet 5.

The monitor terminal 10 transmits a monitor request command to the monitor server 20 via the Internet 5 to request initiation or termination of monitoring of a designated repeater station 2. Using a weak radio wave, the monitor terminal 10 sends the radios 1 monitor data for the repeater station 2 of interest transmitted from the monitor server 20 in response to the monitor request command.

Figure 2:
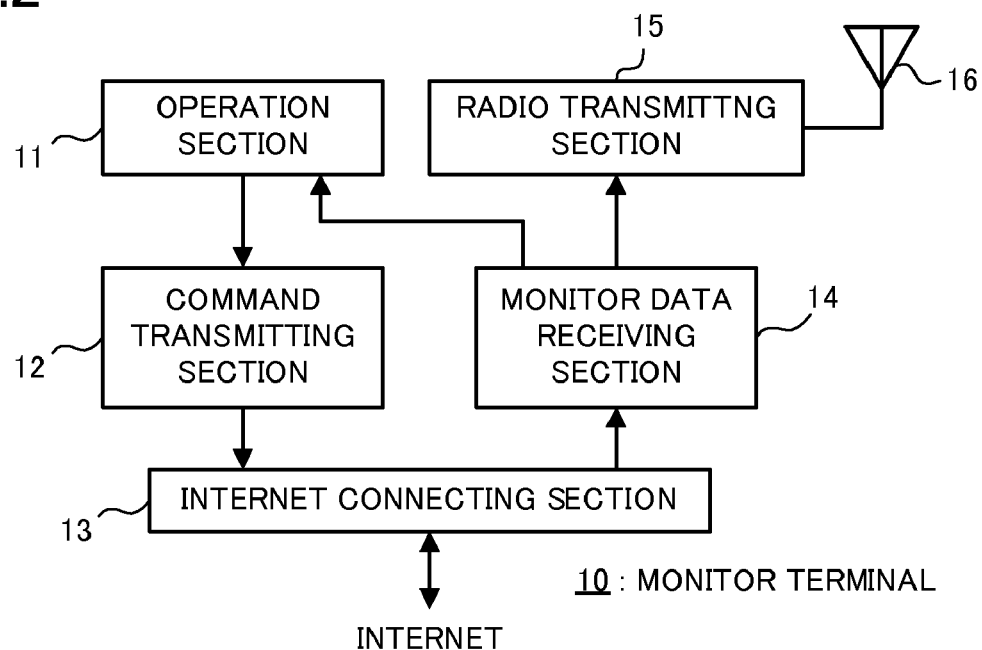
FIG. 2 is a diagram showing the configuration of a monitor terminal in FIG. 1.

As shown in FIG. 2, the monitor terminal 10 has an operation section 11, a command transmitting section 12, an Internet connecting section 13, a monitor data receiving section 14, a radio transmitting section 15, and a transmission antenna 16.

The operation section 11 is used to accept an input made by an operator to transmit the monitor request command and monitor a response to the transmitted monitor request command, for example.

The command transmitting section 12, connected to the operation section 11, generates the monitor request command which is a message of a predetermined format according to the operator's input operation, and outputs the monitor request command to the Internet connecting section 13.

The Internet connecting section 13 adds a header according to the Internet protocol to the message (i.e., monitor request command) output from the command transmitting section 12, and transmits the resultant message to the monitor server 20 via the Internet 5. The Internet connecting section 13 also has a function of outputting a message received from the monitor server 20 via the Internet 5 (monitor data, another response message or the like sent from the repeater station 2) to the monitor data receiving section 14.

The monitor data receiving section 14 converts the monitor data transmitted from the repeater station 2 to a predetermined format, and outputs the monitor data to the radio transmitting section 15. The monitor data receiving section 14 also has a function of outputting a response message or the like from the monitor server 20 to the operation section 11. The contents of the response message or the like output to the operation section 11 may be displayed on, for example, a monitor or the like (not shown) so that the operator is easier to confirm it.

The radio transmitting section 15 generates data obtained by adding a radio part header such as a sync code to the monitor data output from the monitor data receiving section 14, and transmits the data from the transmission antenna 16 on a weak radio wave. This weak radio wave has a weak level which is not restricted by the modulation method or the occupying band according to the radio law (e.g., transmission output of 245 pW or so). To simplify the radio circuit using higher harmonics, the transmission frequency in use is 432.00 MHz for the 430 MHz band, and 1296.00 MHz for the 1.2 GHz band.

The radio signal transmitted from the transmission antenna 16 is received by a radio 1 located nearby.

The monitor server 20 relays a message which is exchanged between the monitor terminal 10 and the monitor station 30.

In response to the monitor request command transmitted from the monitor terminal 10, the monitor server 20 transmits a monitor instruction command instructing the initiation or termination of transmission of monitor data to the monitor station 30 of interest via the Internet 5. Then, the monitor server 20 transfers monitor data or a response message transmitted from the monitor station 30 to which the monitor instruction command has been transmitted, to the requesting monitor terminal 10 via the Internet 5.

Figure 3:
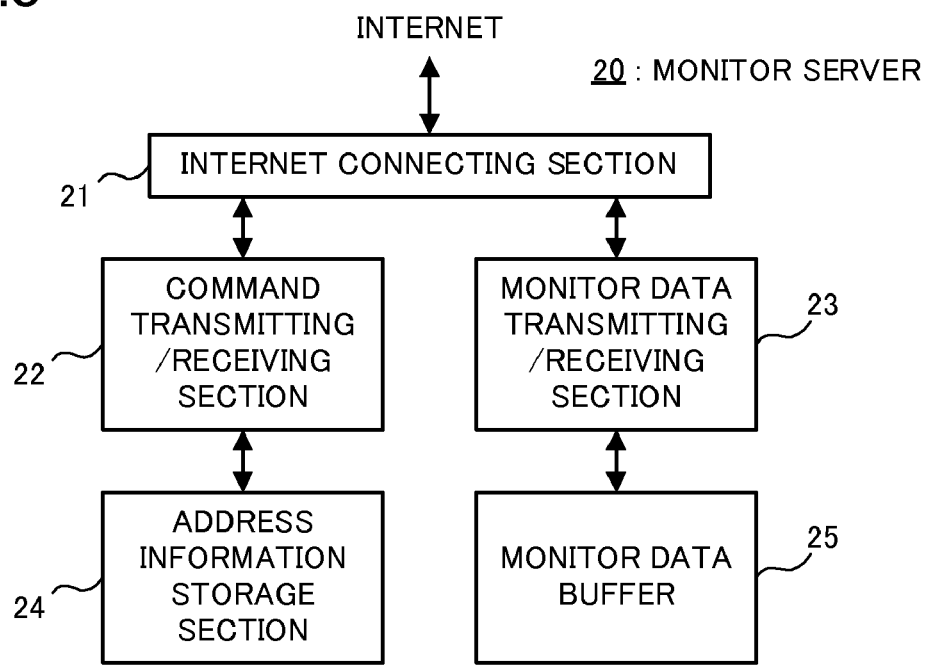
FIG. 3 is a diagram showing the configuration of a monitor server in FIG. 1.

As shown in FIG. 3, the monitor server 20 includes an Internet connecting section 21, a command transmitting/receiving section 22, a monitor data transmitting/receiving section 23, an address information storage section 24, and a monitor data buffer 25.

The Internet connecting section 21 transmits/receives a message (command, monitor data) to/from the monitor terminal 10 and the monitor station 30 via the Internet 5 according to the Internet protocol.

The command transmitting/receiving section 22, connected to the Internet connecting section 21, transmits a monitor instruction command instructing the initiation or termination of monitoring to the monitor station 30 corresponding to the repeater station 2 to be monitored, in response to the monitor request command received from the monitor terminal 10.

The address information storage section 24, connected to the command transmitting/receiving section 22, stores a table where the area IDs of the individual repeater stations 2 are associated with the IP addresses of the corresponding monitor stations 30.

The monitor data transmitting/receiving section 23, connected to the Internet connecting section 21, transfers monitor data received from the monitor station 30 to the requesting monitor terminal 10.

The monitor transmitting/receiving section 23 temporarily saves the received monitor data in the monitor data buffer 25. As the monitor data is temporarily saved in the monitor data buffer 25 this way, it is possible to delay (adjust the time of) the transfer of the monitor data as needed.

The monitor station 30 intercepts a radio signal transmitted from the repeater station 2 located within the same area, and transmits the intercepted communication contents (or communication conditions) to the monitor server 20 as monitor data via the Internet 5 in response to the monitor instruction command from the monitor server 20.

Figure 4:
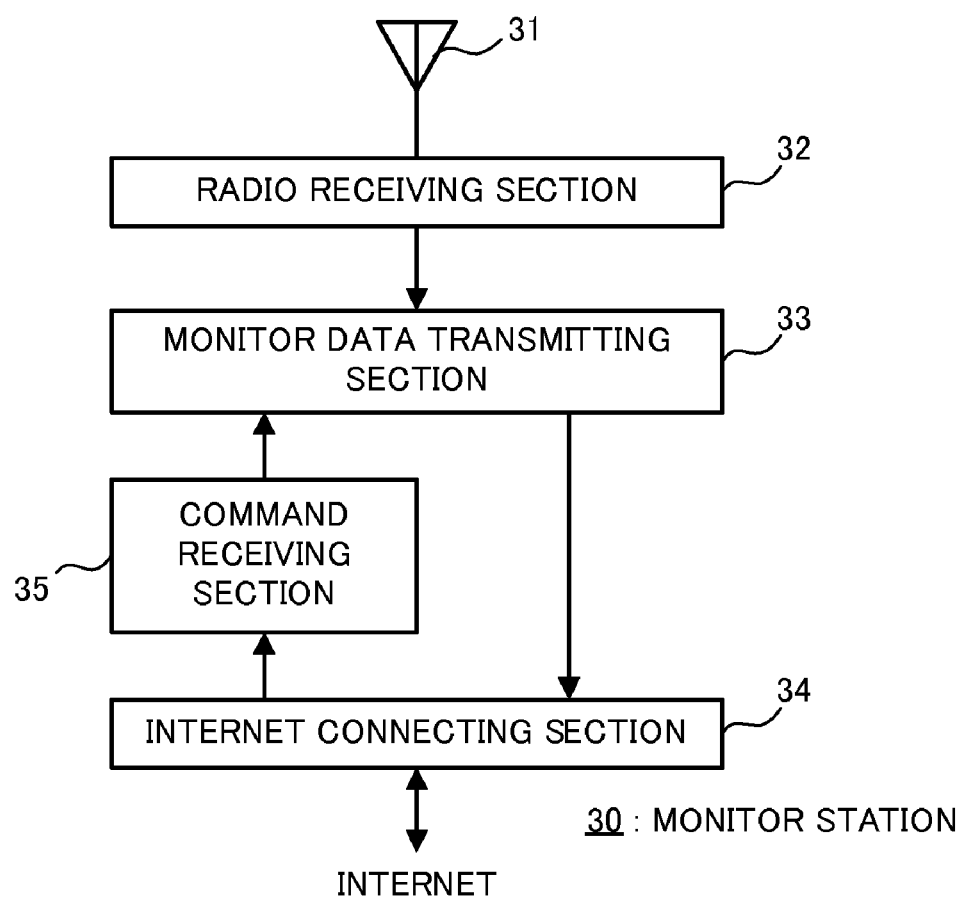
FIG. 4 is a diagram showing the configuration of a monitor station in FIG. 1.

As shown in FIG. 4, the monitor station 30 includes a reception antenna 31, a radio receiving section 32, a monitor data transmitting section 33, an Internet connecting section 34, and a command receiving section 35.

The radio receiving section 32 receives a radio signal (radio packet), transmitted from the repeater station 2, via the reception antenna 31, and outputs the received radio packet to the monitor data transmitting section 33.

Upon reception of a monitor start instruction command from the monitor server 20 via the Internet 5, the command receiving section 35 instructs the monitor data transmitting section 33 to transmit the radio packet received by the radio receiving section 32. In response to the instruction, the monitor data transmitting section 33 outputs monitor data generated based on the radio packet received by the radio receiving section 32 to the Internet connecting section 34. The Internet connecting section 34 transmits this monitor data to the monitor server 20 via the Internet 5. Upon reception of a monitor end instruction command from the monitor server 20 via the Internet 5, the command receiving section 35 instructs the monitor data transmitting section 33 to terminate the transmission of the monitor data. In response to the instruction, the monitor data transmitting section 33 terminates the outputting of the monitor data to the Internet connecting section 34.

Next, the operation of the monitor process according to the data communication system shown in FIG. 1 will be described referring to FIG. 5.

First, when the operator uses the operation section 11 in the monitor terminal 10 to perform an operation to request the initiation of monitoring (YES in step S1), the command transmitting section 12 of the monitor terminal 10 generates a monitor start request command (step S2). This operation includes, for example, designation of the area ID (e.g., call sign of the amateur radio) of a desired repeater station 2 to be monitored, and depression of a "Start button" or the like. The monitor start request command which is generated by the command transmitting section 12 includes the call sign of the repeater station 2 to be monitored and information indicating a request to start monitoring (type of a command indicating a monitor start request).

The Internet connecting section 13 adds a header according to the Internet protocol to the monitor start request command generated by the command transmitting section 12 to form a command packet as shown in FIG. 6, and transmits the command packet onto the Internet 5 (step S3).

At this time, the IP address of the monitor terminal 10 is stored at a sender address in the IP (Internet Protocol) header of the command packet, and the IP address of the monitor server 20 is stored at a destination address.

The monitor start request command transmitted onto the Internet 5 from the monitor terminal 10 is received by the Internet connecting section 21 of the monitor server 20 (step S4), and is output to the command transmitting/receiving section 22.

Referring to the address information storage section 24, the command transmitting/receiving section 22 searches for the IP address of the monitor station 30 corresponding to the area ID (call sign) of the repeater station 2 to be monitored. Then, the command transmitting/receiving section 22 generates a message (monitor start instruction command) to instruct the searched monitor station 30 to start monitoring.

The Internet connecting section 21 forms the monitor start instruction command, generated by the command transmitting/receiving section 22, into a command packet, and transmits the command packet onto the Internet 5 (step S5). The format of the command packet at this time is substantially similar to the one shown in FIG. 6; the IP address of the monitor server 20 is stored at the sender address while the IP address of the searched monitor station 30 is stored at the destination address.

The Internet connecting section 34 of the destination monitor station 30 receives the message (monitor start instruction command) transmitted from the monitor server 20 (step S6), and outputs the received message to the command receiving section 35. When confirming that the received message is the monitor start instruction command instructing the initiation of monitoring, the command receiving section 35 instructs the monitor data transmitting section 33 to output the radio packet received from the repeater station 2 as monitor data.

In response to the output instruction from the command receiving section 35, the monitor data transmitting section 33 starts a process of transmitting monitor data. Specifically, the monitor data transmitting section 33 converts a signal in the radio packet of the D-STAR format received from the repeater station 2 to a data packet signal according to the Internet protocol.

The frame structure of a radio packet of the D-STAR format will be described below. A radio packet of the D-STAR format has a radio part header and a data part as shown in FIG. 7. The radio part header includes a sync pattern including a bit sync and frame sync, an ID area for the call signs or the like of the sender and the destination, and an error correction code (FCS) and the like. The data part alternately includes audio frames and data frames. The audio frame is a compressed code digitized by a codec complying with the AMBE (Advanced Multi-Band Excitation) standard developed by DVS, Inc. in America.

As shown in FIG. 8, a data part includes a header part, such as an MAC header and IP header, and a data part having an audio frame and a data frame.

The monitor data transmitting section 33 divides the data part of the received radio packet of the D-STAR format to data segments of a predetermined size, adds a header part converted according to the Internet protocol to each data segment, thereby generating monitor data. Then, the monitor data transmitting section 33 transmits the generated monitor data onto the Internet 5 via the Internet connecting section 34 (step S7). Here, the IP address of the monitor station 30 is stored at the sender address of the IP header while the IP address of the monitor server 20 which has transmitted the monitor start instruction command is stored at the destination address.

The monitor transmitting/receiving section 23 of the monitor server 20 temporarily saves the monitor data, received via the Internet connecting section 21, in the monitor data buffer 25. The monitor transmitting/receiving section 23 reads the saved monitor data from the monitor data buffer 25 at a given timing, and transfers the monitor data to the monitor terminal 10 (step S8).

The monitor data receiving section 14 of the monitor terminal 10 receives the monitor data, transferred from the monitor server 20, via the Internet connecting section 13 (step S9). Then, the monitor data receiving section 14 converts the received monitor data to a radio packet of the D-STAR format, and outputs the radio packet to the radio transmitting section 15. The format of the radio packet at this time is similar to the one shown in FIG. 7; "receiver relay station call sign" and "destination station call sign" in the ID of the radio part header are written over with predetermined text data (e.g., "MONITOR), and "sender relay station call sign" and "local station call sign 1, 2" are filled with space.

The radio transmitting section 15 of the monitor terminal 10 transmits the radio packet, output from the monitor data receiving section 14, from the transmission antenna 16 using a weak radio wave (step S10). A radio 1 located near the monitor terminal 10 can receive the radio packet transmitted from the transmission antenna 16, convert the audio frame in its data part to an analog signal, and output the analog signal from a speaker.

The processes in the steps S7 to S10 are repeatedly executed until the operator uses the operation section 11 to perform an operation to request the termination of monitoring (YES in step S11) every time the monitor station 30 receives a radio signal from a repeater station 2 to be monitored. Hearing the audio signal output from the radio 1 located near the monitor terminal 10, the operator can grasp the communication conditions of the repeater station 2.

When the operator performs an operation to request the termination of monitoring (e.g., depression of the "End button") (YES in step S11), the command transmitting section 12 of the monitor terminal 10 generates a monitor end request command including the call sign of the repeater station 2 to be monitored and information indicating the termination of monitoring being requested (command type indicating the monitor end request). The generated monitor end request command is transmitted onto the Internet 5 by the Internet connecting section 13 in the same process as that of the step S3 (step S12).

The monitor end request command transmitted onto the Internet 5 from the monitor terminal 10 is received by the Internet connecting section 21 of the monitor server 20 (step S13), and is output to the command transmitting/receiving section 22. The command transmitting/receiving section 22 generates a monitor end instruction command for the monitor station 30, and transmits the monitor end instruction command onto the Internet 5 via the Internet connecting section 21 in the same process as that of the step S5 (step S14).

The Internet connecting section 34 of the monitor station 30 receives a message (monitor end instruction command) transmitted from the monitor server 20, and outputs the received message to the command receiving section 35. When confirming that the received message is the monitor end instruction command instructing the termination of monitoring, the command receiving section 35 instructs the monitor data transmitting section 33 to terminate the operation of transmitting monitor data.

As described above, to enable monitoring the communication conditions of a remote repeater station 2, the data communication system according to the embodiment is provided with the monitor terminals 10, the monitor server 20 and the monitor stations 30 in addition to the basic configuration of the D-STAR system. This can allow the communication conditions of a desired repeater station 2 to be monitored without affecting the existing D-STAR system at all. It is therefore possible to adequately use a remote repeater station 2 and call a destination radio 1 at an adequate timing.

Because the monitor terminal 10 transmits monitor data on a weak radio wave using a radio packet of the same format as that of the D-STAR system, the radio transmitting section 15 does not need particularly high specifications. Therefore, the monitor terminal 10 can be manufactured at a low cost.

Further, the data communication system does not require any dedicated monitor receiver having the codec for the D-STAR system to grasp communication conditions of a desired repeater station 2. Advantageously, the system can grasp the concerned communication conditions by using a general-purpose radio terminal (radio 1) used in the D-STAR system.

[Second Embodiment]

Figure 9:
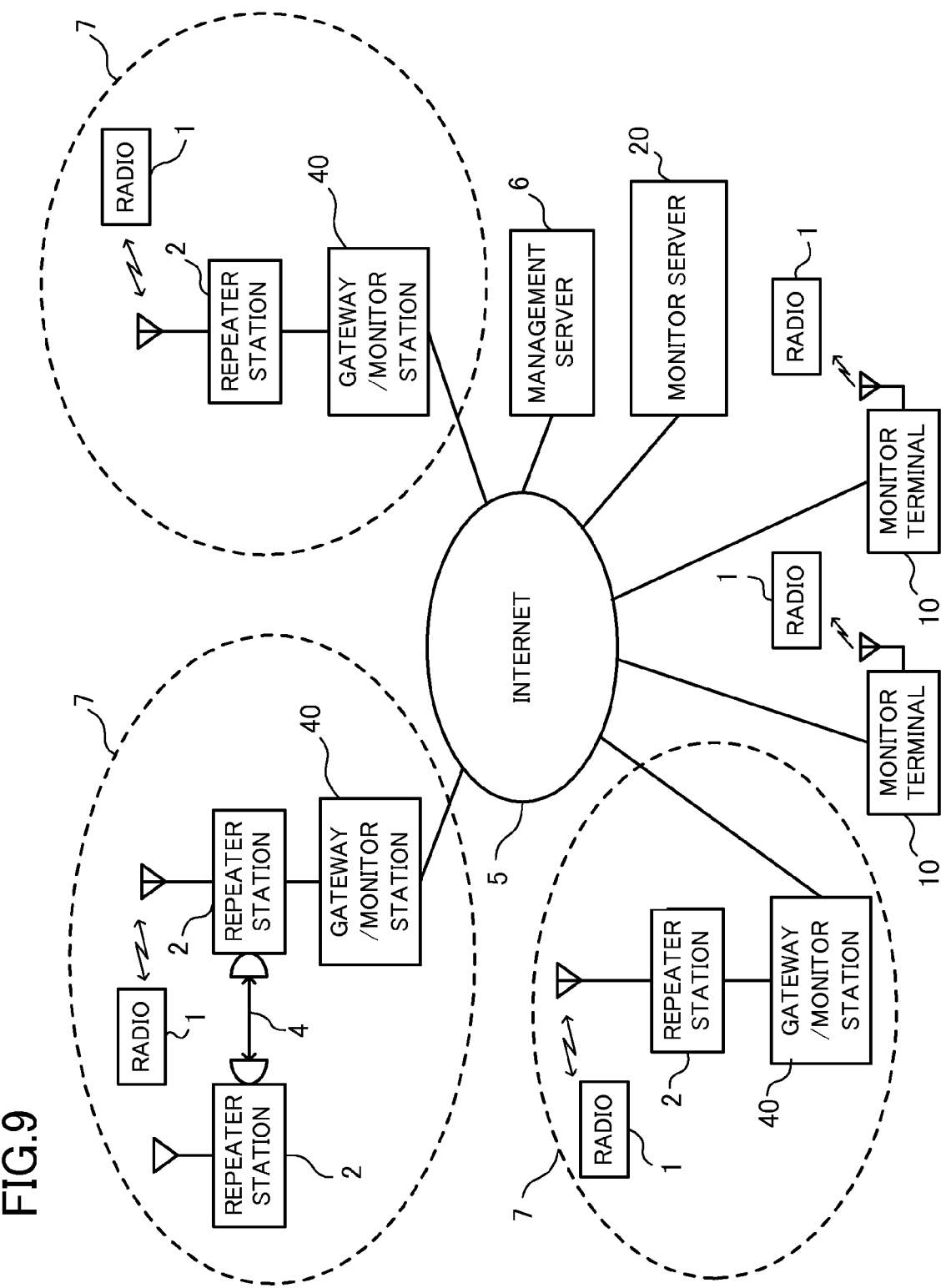
FIG. 9 is a diagram showing the general configuration of a data communication system according to a second embodiment of the invention.

FIG. 9 is a diagram showing the general configuration of a data communication system according to the second embodiment of the invention. According to the first embodiment, to monitor a repeater station 2, the monitor station 30 which intercepts a radio wave transmitted from the repeater station 2 is provided. The data communication system according to the second embodiment differs from the data communication system according to the first embodiment in that a gateway/monitor station 40 which provides a gateway with the function of a monitor station is provided in place of the gateway 3 and the monitor station 30 (see FIG. 1).

That is, in addition to the function of the conventional gateway, the gateway/monitor station 40 has a function of transmitting, as the monitor data, data to be exchanged between a repeater station 2 under control and a radio 1 to the monitor server 20 via the Internet 5 in response to a monitor instruction command from the monitor server 20.

Figure 10:
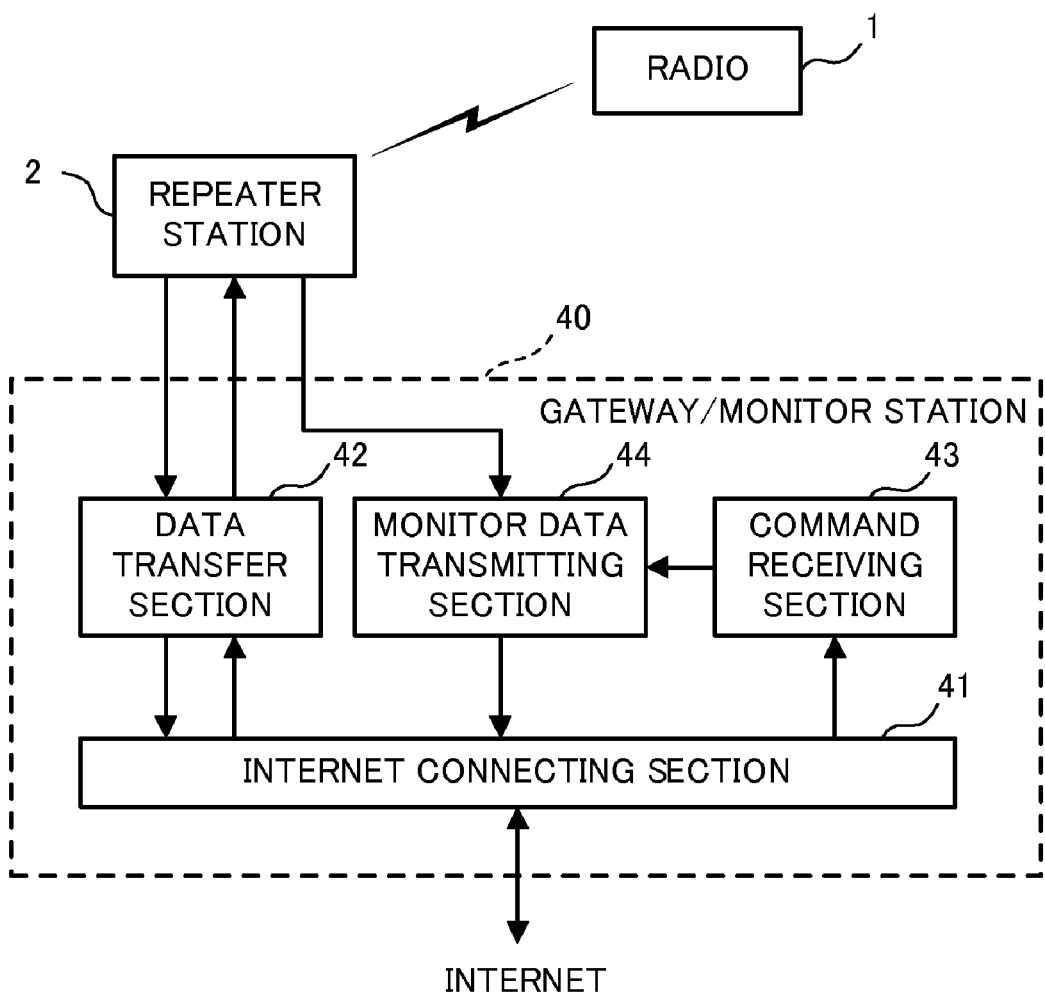
FIG. 10 is a diagram showing the configuration of a gateway/monitor station in FIG. 9.

The gateway/monitor station 40, as shown in FIG. 10, has a command receiving section 43 and a monitor data transmitting section 44 which are needed for the gateway/monitor station 40 to serve as a monitor station, in addition to an Internet connecting section 41 and a data transfer section 42 which are the original functions of the gateway.

Upon reception of a monitor start instruction command from the monitor server 20 via the Internet connecting section 41, the command receiving section 43 instructs the monitor data transmitting section 44 to start transmitting monitor data.

Upon reception of a monitor end instruction command from the monitor server 20, the command receiving section 43 instructs the monitor data transmitting section 44 to terminate the transmission of monitor data.

Upon reception of an instruction to start transmission of monitor data from the command receiving section 43, the monitor data transmitting section 44 acquires, from the repeater station 2, data transmitted to the radio 1 from the repeater station 2 and data received by the repeater station 2 from the radio 1. Then, the monitor data transmitting section 44 outputs the data acquired from the repeater station 2 to the Internet connecting section 41 as monitor data. The Internet connecting section 41 transmits the monitor data to the monitor server 20 via the Internet 5.

Upon reception of an instruction to terminate the transmission of monitor data from the command receiving section 43, the monitor data transmitting section 44 stops outputting the monitor data to the Internet connecting section 41.

The operation of the monitor process in the data communication system according to the second embodiment is substantially the same as that of the first embodiment excluding the operation of the gateway/monitor station 40.

That is, upon reception of the monitor start instruction command from the monitor server 20, the gateway/monitor station 40 does not receive a radio signal to be transmitted from a repeater station 2, but transmits the same data as data which the repeater station 2 transmits/receives to/from the radio 1 to the monitor server 20 as monitor data via the Internet 5.

The operation of the monitor terminal 10 according to the second embodiment is the same as that of the first embodiment. In addition, the monitor server 20 performs the operation as described in the foregoing description of the first embodiment, except that the destinations of the monitor start instruction command and the monitor end instruction command are set to the IP address of the gateway/monitor station 40.

As apparent from the above, the data communication system according to the second embodiment has the configuration of the D-STAR system as its basic configuration and is provided with the gateway/monitor station 40 which has the gateway function and the monitor function in order to monitor the communication conditions of a remote repeater station 2.

Accordingly, unlike the first embodiment, the second embodiment does not require the monitor station 30, and adds slight functions to the gateway and the repeater station 2 of the existing D-STAR system to enable monitoring the communication conditions of a desired repeater station 2, thus making it possible to adequately use a remote repeater station 2 and call a destination radio 1 at an adequate timing.

Because the monitor terminal 10 transmits monitor data on a weak radio wave using a radio packet of the same format as that of the D-STAR system, the radio transmitting section 15 does not need particularly high specifications. Therefore, the monitor terminal 10 can be manufactured at a low cost.

Further, a dedicated monitor receiver having the codec for the D-STAR system is unnecessary, which brings about an advantage such that a general-purpose radio terminal (radio 1) to be used in the D-STAR system can be used to grasp the communication conditions of a desired repeater station 2.

The present invention is not limited to the foregoing embodiments, and can be modified in various other forms.

(a) Although the foregoing descriptions of the embodiments have been given of the system that monitors repeater stations 2 in the amateur radio D-STAR system, the invention can also be adapted to various data communication systems which use the Internet or other communication networks as a relay for radio communication.

(b) According to the embodiments, the monitor server 20 relays a message (command, monitor data or the like) between the monitor terminal 10 and the monitor station 30 (or gateway/monitor station 40). However, the invention may be configured so that the monitor terminal 10 and the monitor station 30 exchange a message directly without intervening the monitor server 20.

Such a configuration can be achieved by, for example, providing the monitor terminal 10 with information indicating the association of the monitor station 30 (or gateway/monitor station 40) with the repeater station 2, or by allowing the monitor terminal 10 to inquire the management server 6 about such information.

(c) Although the foregoing descriptions of the embodiments have been given of the case where the individual components of the monitor terminal 10 (see FIG. 2), the monitor server 20 (see FIG. 3), the monitor station 30 (see FIG. 4) and the gateway/monitor station 40 (see FIG. 10) are hardware components which have independent functions, the functions of the individual components may be realized by software or running a program.

(d) The frame structure of a packet at the time of data communication is not limited to those exemplified in FIGS. 6 to 8, and a frame structure matching a system to which the invention is adapted can be selected and used adequately.

(e) Although the monitor station 30 intercepts a radio signal transmitted from the repeater station 2, and transmits the intercepted radio signal to the monitor server 20 as monitor data according to the first embodiment, the monitor station 30 may intercept a radio signal transmitted from a radio 1 (i.e., radio signal received by the repeater station 2), and may transmit the intercepted radio signal as monitor data. Further, the monitor station 30 may intercept a radio signal transmitted/received from/by the repeater station 2, and may transmit the intercepted radio signal to the monitor server 20 as monitor data.

(f) Although the foregoing descriptions of the embodiments have been given of the operation in the case where a single monitor terminal 10 outputs a monitor request command to a single monitor station 30 or a single gateway/monitor station 40 (hereinafter referred to as "monitor station 30 or the like"), it is possible to cope with a case where a plurality of monitor terminals 10 output monitor request commands to the same monitor station 30 or the like.

The operation of the monitor server 20 in this case will be described. Upon reception of monitor request commands targeted for the same repeater station 2 from a plurality of monitor terminals 10, the monitor server 20 transmits only a single monitor instruction command to the associated monitor station 30 or the like.

Then, upon reception of monitor data from the monitor station 30 or the like, the monitor server 20 transmits the received monitor data to all the monitor terminals 10 that have transmitted the monitor request commands.

More specifically, upon reception of a monitor start request command targeted for a repeater station 2 from a first monitor terminal 10, the monitor server 20 transmits a monitor start instruction command to the associated monitor station 30 or the like. Thereafter, upon reception of a monitor start request command targeted for the same repeater station 2 as the one designated by the previous monitor start request command from a second monitor terminal 10, the monitor server 20 does not transmit the monitor start instruction command to the associated monitor station 30 or the like again.

Upon reception of monitor data from the monitor station 30 or the like, the monitor server 20 transfers the received monitor data to the first and second monitor terminals 10.

When monitor end request commands are received from all the monitor terminals 10 (the first and second monitor terminals 10 herein), the monitor server 20 transmits a monitor end instruction command to the monitor station 30 or the like. In other words, when the monitor end request command is received from either the first monitor terminal 10 or the second monitor terminal 10, the monitor server 20 does not transmit the monitor end instruction command to the monitor station 30 or the like. In this case, monitor data may not be transferred to the monitor terminal 10 that has transmitted the monitor end request command.

As apparent from the above, the operation of the monitor server 20 can reduce the load of the monitor station 30 or the like even when a plurality of monitor terminals 10 output monitor request commands targeted for the same monitor station 30 or the like.

(g) Although the monitor server 20 has the monitor data buffer 25 to temporarily store monitor data according to the embodiments, monitor data may not be stored in the monitor data buffer 25 and may be transferred at once. In this case, the monitor server 20 can be configured not to have the monitor data buffer 25.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A repeater monitor system in a communication system including plural sets each having a single repeater station or a plurality of repeater stations which relay radio signal communication between radio communication devices, and a gateway which manages an operation of the single repeater station or the plurality of repeater stations and relays communication between the repeater station to be managed and an Internet, the repeater monitor system monitoring communication contents of the repeater station and comprising:
   a monitor terminal;
   a monitor server; and
   a plurality of monitor stations,
   wherein the monitor terminal is configurable to:
      initiate the monitoring by transmitting via the Internet a monitor request command for requesting monitor data on the communication content of a repeater station designated by an operator to the monitor server,
      receive via the Internet the monitor data transmitted from the monitor server, and
      transmit the received monitor data as a radio signal,
   wherein the monitor server is configurable to:
      detect a monitor station corresponding to the designated repeater station from a content of the monitor request command received from the monitor terminal,
      transmit via the Internet a monitor instruction command generated based on the monitor request command to the detected monitor station,
      receive via the Internet the monitor data transmitted from the monitor station, and
      transmit via the Internet the received monitor data to the monitor terminal,
   wherein the monitor station is located in a communication range of the repeater station to receive a radio signal transmitted from the repeater station to the radio communication device or vice versa, and transmit via the Internet the received radio signal as the monitor data to the monitor server in response to the monitor instruction command received via the Internet, and
   wherein upon reception of monitor request commands designating a same repeater station from a plurality of monitor terminals, the monitor server transmits the monitor instruction command to a corresponding monitor station only once, and upon reception of monitor data corresponding to the monitor instruction command transmitted from the monitor station, the monitor server transmits the received monitor data to the plurality of monitor terminals.

2. The repeater monitor system according to claim 1, wherein the monitor terminal transmits the monitor data as a radio signal using a radio wave format receivable by the radio communication device.

3. A repeater monitor system in a communication system including plural sets each having a single repeater station or a plurality of repeater stations which relay radio signal communication between radio communication devices, and a gateway which manages an operation of the single repeater station or the plurality of repeater stations and relays communication between the repeater station to be managed and an Internet, the repeater monitor system monitoring communication contents of the repeater station and comprising:

a monitor terminal; and a monitor server, wherein the monitor terminal is configurable to:
- initiate monitoring by transmitting via the Internet a monitor request command for requesting monitor data on the communication content of a repeater station designated by an operator to the monitor server,
- receive via the Internet the monitor data transmitted from the monitor server, and
- transmit the received monitor data as a radio signal, wherein the monitor server is configurable to:
- detect a gateway corresponding to the designated repeater station from a content of the monitor request command received from the monitor terminal,
- transmit via the Internet a monitor instruction command generated based on the monitor request command to the detected gateway,
- receive via the Internet the monitor data transmitted from the gateway, and
- transmit via the Internet the received monitor data to the monitor terminal, wherein upon reception of the monitor instruction command via the Internet, the gateway transmits, via the Internet, data to be transmitted to the radio communication device, or data received from the radio communication device, by the repeater station, to the monitor server as the monitor data, and wherein upon reception of monitor request commands designating a same repeater station from a plurality of monitor terminals, the monitor server transmits the monitor instruction command to a corresponding gateway only once, and upon reception of monitor data corresponding to the monitor instruction command transmitted from the gateway, the monitor server transmits the received monitor data to the plurality of monitor terminals.

4. The repeater monitor system according to claim 3, wherein the monitor terminal transmits the monitor data as a radio signal using a radio wave format receivable by the radio communication device.

5. A repeater monitor method in a communication system including plural sets each having a single repeater station or a plurality of repeater stations which relay radio signal communication between radio communication devices, and a gateway which manages an operation of the single repeater station or the plurality of repeater stations and relays communication between the repeater station to be managed and an Internet, the repeater monitor method monitoring communication contents of the repeater station and comprising:

causing a monitor terminal to initiate the monitoring by transmitting via the Internet a monitor request command for requesting monitor data on the communication content of a repeater station designated by an operator to a monitor server;

causing the monitor server to detect a monitor station located in a communication range of the designated repeater station from a content of the monitor request command received from the monitor terminal, transmit via the Internet a monitor instruction command generated based on the monitor request command to the detected monitor station;

causing the monitor station to receive a radio signal transmitted from the repeater station to the radio communication device or vice versa, and transmit via the Internet the received radio signal as the monitor data to the monitor server after receiving the monitor instruction command;

causing the monitor server to receive via the Internet the monitor data transmitted from the monitor station and transmit via the Internet the received monitor data to the monitor terminal; and causing the monitor terminal to receive via the Internet the monitor data transmitted from the monitor server and transmit the received monitor data as a radio signal using a radio wave format receivable by the radio communication device, wherein upon reception of monitor request commands designating a same repeater station from a plurality of monitor terminals, the monitor server transmits the monitor instruction command to a corresponding monitor station only once, and upon reception of monitor data corresponding to the monitor instruction command transmitted from the monitor station, the monitor server transmits the received monitor data to the plurality of monitor terminals.

\* \* \* \* \*